United States Patent [19]
Monte

[11] Patent Number: 6,051,270
[45] Date of Patent: *Apr. 18, 2000

[54] LIQUID AMINO ACID NUTRITIONAL COMPOSITION

[75] Inventor: Woodrow C. Monte, Tempe, Ariz.

[73] Assignee: Galagen, Inc., Arden Hills, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/964,556

[22] Filed: Nov. 5, 1997

[51] Int. Cl.$^7$ ................... A23J 1/00; A23L 2/00; A23D 7/00; A23G 3/00

[52] U.S. Cl. ............ 426/656; 426/590; 426/602; 426/658; 514/2

[58] Field of Search ............. 426/72, 74, 658, 426/661, 804, 656, 602, 613

[56] References Cited

U.S. PATENT DOCUMENTS

| | | | |
|---|---|---|---|
| 4,670,268 | 6/1987 | Mahmound | 426/602 |
| 5,422,127 | 6/1995 | Dube et al. | 426/73 |
| 5,550,106 | 8/1996 | Petschow et al. | 426/590 |
| 5,719,133 | 2/1998 | Schmidl et al. | 514/58 |

OTHER PUBLICATIONS

Patent Abstracts of Japan. AN 07–255398 for JP Application No. 06–71630. Inventors: Suzuki et al., Oct. 1995.

New Protein Foods. vol. 1A. Technology. p. 70. Academic Press. New York. Editor: Altschul, 1974.

Abstract of 07/255,398, "Oral and Perrectal Nutrient Composition Having High Preservative Stability and Palatability," Oct. 9, 1995, 1 page.

Bioactive Peptide/Glutamine Peptide WGE 80 GPN Product Literature, DMV International, Jul. 1995, 6 pages.

Altschul, "New Protein Foods," Academic Press, 1974, vol. 1A, p. 70.

*Primary Examiner*—Anthony J. Weier
*Attorney, Agent, or Firm*—Fish & Richardson, P.C., P.A.

[57] ABSTRACT

A liquid enteral tube feeding composition contains free amino acids and glutamine in a dipeptide form and prevents creaming out of fat from the composition.

17 Claims, No Drawings

LIQUID AMINO ACID NUTRITIONAL COMPOSITION

This invention relates to enteral tube feeding compositions.

More particularly, the invention relates to a liquid enteral tube feeding composition which contains free amino acids and glutamine in a di-peptide form and which has extended shelf life during which glutamine will not convert in situ into glutamate.

In another respect, the invention relates to a method which, in comparison to prior art procedures, significantly reduces the cost of producing liquid enteral tube feeding composition with free amino acids because the method produces a ready-to-use liquid enteral tube feeding composition instead of the powdered feeding compositions which are now on the market and which must be reconstituted prior to use.

High amino acid—glutamine powdered enteral elemental tube feeding products are well known, and are reconstituted with water just prior to use. In the United States, the market for such products exceeds $100 million annually. Examples of enteral tube feeding products include VITAL™ and ALITRAQ™ sold by Ross, VIVONEX™ sold by Sandoz, and IMMUNAID™ marketed by McGaw. Disadvantages are associated with such powdered enteral elemental tube feeding products. First, the products are powders which must be mixed. Mixing is labor intensive, increases chances for errors, increases the risk of contamination, and is messy. Second, the products must be in powder form because the amino acid glutamine is not stable in water; it converts quickly to glutamate. This is undesirable because glutamine—and not glutamate—is generally believed to a fuel used preferentially by the gut. It is also undesirable because a high free amino acid content is preferred in enteral tube feeding products for certain critically ill patients. Third, during mixing of high amino acid—glutamine liquid enteral tube feeding products creaming out can occur.

The inability to provide a high amino acid—glutamine enteral tube feeding formula which is stable in liquid form and which does not cream out is why powdered enteral elemental tube feeding products currently dominate the market for high glutamine formulas.

Accordingly, it would be highly desirable to provide a liquid ready-to-use high amino acid enteral tube feeding formulation in which glutamine would not convert quickly to glutamate and in which the remaining protein and nutritional components would also be stable.

Therefore, it is a principal object of the invention to provide an improved enteral tube feeding formulation.

A further object of the invention is to provide an improved liquid enteral tube feeding formulation that includes glutamine and other free amino acids and that has an extended shelf life during which glutamine will not convert to glutamate.

These and other, further and more specific objects and advantages of the invention will be apparent to those skilled in the art from the following detailed description thereof.

Briefly, I have, in the first embodiment of the invention, discovered an improved liquid food composition for ingestion along the digestive tract of a patient. The food composition includes 25% to 95% by weight of water; free amino acids; glutamine; triglycerides of predominantly 6 to 26 carbon atoms in the fatty acid chain; carbohydrates selected from the group consisting of corn syrup solids, trisaccharides, tetrasaccharides, pentasaccharides, hexasaccharides, dextrose, fructose, sucrose, maltose, oligosaccharides and higher saccharides; and, a stabilizer comprising a polyglycerol ester. In a second embodiment of the invention, I have discovered a method for preparing a liquid food composition for ingestion along the digestive tract of a patient. The method includes the step of providing formula components including water; free amino acids including glutamine; triglycerides of predominantly 6 to 26 carbon atoms in the fatty acid chain; carbohydrates selected from the group consisting of corn syrup solids, trisaccharides, tetrasaccharides, pentasaccharides, hexasaccharides, dextrose, fructose, sucrose, maltose, oligosaccharides and higher saccharides; and, a stabilizer comprising a polyglycerol ester. The formula components are mixed to produce the liquid food composition.

The liquid food composition comprising the first embodiment of the invention or produced in the second embodiment of the invention can, if desired, include:

1. From 5% to 48% by weight carbohydrates, preferably 10% to 22% by weight carbohydrates.
2. Glutamine in the range of 0.5% to 8.0% by weight, preferably about 1.5% to 5.0% by weight. The glutamine is preferably in a di-peptide form which is not readily converted to glutamate. The glutainine is also preferably in the form of a protein which is high in glutamine and hydrolyzed to contain a large percentage of short chain peptides.
3. 0.5% to 5.0% by weight, preferably about 1.0 to 3.0% by weight, of free amino acids. The free amino acids include one or more of alanine, arginine, aspartic acid, cystine, glutamic acid, glutamine, glycine, histidine, isoleucine, leucine, lysine, methlanine, phenylalanine, proline, serine, threonine, tryptophan, tyrosine, and valine.
4. Appropriate desired levels of nutritionally required vitamins and minerals, which vitamins and minerals typically comprise 0.1% to 5.0% by weight, preferably 0.5% to 3.0% by weight of the composition.
5. Choline chloride in a concentration in the range of 0.01% to 1.0% by weight, preferably about 0.05% to 0.30% by weight.
6. Soybean oil, sunflower oil, corn oil, coconut oil or any other desired source of fat (preferably medium chain triglycerides with 6 to 26 carbon atoms in the fatty acid chain) in the range of 0.01% to 15.0% by weight, preferably 0.1% to 1.0% by weight. Soybean oil provides triglycerides of predominantly 6 to 26 carbon atoms in the fatty acid chain.

The food composition of the invention can be pasteurized or sterilized because the stabilizer(s) described below prevent precipitation of the various components of the food composition.

Discovering a stabilizer system which would prevent the precipitation of amino acids from the food composition of the first embodiment of the invention or from the food composition produced in the second embodiment of the invention was difficult, and required about one year of testing various stabilizers and stabilizer combinations. The preferred stabilizer system of the invention includes:

1. Starch, preferably potato, rice, and/or tapioca starch, in a concentration in the liquid food composition of the invention in the range of 0.05 to 2.80% by weight, preferably 0.10 to 0.50% by weight.
2. Carrageenan in a concentration in the liquid food composition of the invention in the range of 0.002% to 0.10% by weight, preferably 0.01 to 0.04% by weight. If desired, xanthan gum, locus bean gum, monodiglycerides, guar gum or other gums can be utilized in combination with or in place of carrageenan.
3. Lecithin in a concentration in the liquid food composition of the invention in the range of 0.01% to 0.25% by weight, preferably 0.05% to 0.15% by weight.

4. A polyglycerol ester in a concentration in the liquid food composition of the invention in the range of 0.001% to 0.25% by weight, preferably 0.005% to 0.05% by weight. The presently preferred polyglycerol esters are made from edible, refined vegetable fatty acids, and the polyglycerol moiety is mainly di-, tri-, and tetraglycerol. The polyglycerol ester is critical in the practice of the invention.

While it may be possible to omit lethicin from the stabilizer system of the invention, it is believed that the starch, carageenen, and polyglycerol ester (or, in the event these components have equivalents, their equivalents) are critical to the stabilizer system.

The following examples depict the presently preferred embodiments of the invention for the purposes of illustrating the practice thereof and not by way of limitation of the scope of the invention. In the examples, all proportions are by weight, unless otherwise noted.

EXAMPLE 1

A liquid enteral tube feeding composition was prepared from the ingredients listed below.

| Component | Grams |
| --- | --- |
| WATER | 3,023,698.00 |
| MALTRIN M 100 (Polysaccharides) [Grain Processing[1]] | 672,096.00 |
| AVEBE PREJEL VA-70 (Rice Starch) | 12,000.00 |
| SOYBEAN OIL | 25,362.00 |
| AMINO ACID BLEND [Ajinomoto[2]] | 81,791.00 |
| GLUTAMINE HYDROLYZATE WGE80GPN [DMV[3]] | 133,258.00 |
| CENTROLEX-F LECITHIN [Central Soya[4]] | 4,082.00 |
| VISCARIN SD 389 CARRAGEENAN [FMC[4]] | 1,000.00 |
| CHOLINE CHLORIDE | 8,427.00 |
| GRINDSTED PGE 55-A K [Danisco Ingred USA[6]] | 49,157.00 |

[1]Grain Processing Corporation, 1600 Oregon Street, Muscatine, IA 52761, telephone 1-800-448-4472.
[2]Ajinomoto U.S.A., Inc., Glenpointe Center West, 500 Frank W. Burr Boulevard, Teaneck, New Jersey 07666-6894. The amino acid blend includes the following free amino acids: L-arginine, L-valine, L-isoleucine, leucine, L-lysine, L-phenylalanine, L-threonine, L-methionine, L-histidine, and L-tryptophan.
[3]DMV International. Glutamine hydrolysate WGE80GPN (hereafter "80GPN") is a neutral pH, wheat protein hydrolysate manufactured under carefully controlled conditions using food grade enzymes. 80GPN has an average molecular weight of 670 D and 1% by weight free amino acids. The amino acids include alanine, arginine, aspartic acid, cystine, glutamic acid, glutamine, glycine, histidine, isoleucine, leucine, lysine, methlanine, phenylalanine, proline, serine, threonine, tryptophan, tyrosine, and valine. The total nitrogen in 80GPN is 13.7% by weight. The total protein in 80GPN is 79.0% by weight. 80GPN includes 0.1% by weight fat, 15.1% by weight carbohydrates, and 4.6% by weight moisture.
[4]Central Soya, P.O. Box 1400, Fort Wayne, IN 46801, telephone 1-800-348-0960.
[5]FMC Corporation, 1735 Market Street, Philadelphia, PA 19103, telephone 1-800-526-3649.
[6]Danisco Ingredients USA, Inc of 201 New Century Parkway, P.O. Box 26, New Century, Kansas 66031, USA; Telephone 913-764-8100; Fax 913-764-5407. GRINDSTED (TM) PGE 55-A K (hereafter "PGE 55") is a polyglycerol ester made from edible, refined vegetable fatty acids. The polyglycerol moiety is mainly di-, tri-, and tetraglycerol. Normal usage of PGE 55 is in cakes, cake mixes, shortenings, cream fillings, icings, and confectionery products. The potential benefits of PGE 55 in such cakes, etc. is that it ensures good aeration of cake batters, improves crumb texture in cakes, and provides a smooth, creamy texture in frostings and cream fillings. By way of example, the typical usage of PGE 55 in a cake shortening is 2.0 to 4.0% by weight, and in confectionery products is 2.0 to 3.0% by weight.

The ingredients listed above are blended together at room temperature to form a liquid food composition. The pH of the resulting aqueous food composition is 6.8, preferably in the range of 6.2 to 7.5. The approximate percent calories from the various ingredients are carbohydrates 50%, fat 20%, and protein 30%. The carbohydrates included in the liquid food composition include sucrose, dextrose, maltose, lactose, trisaccharides, tetrasaccharides, pentasaccharides, hexasaccharides, and higher saccharides. The liquid food composition has a caloric density (Cal/ml) of about 1.0; and, a total Cal/Nitrogen ratio of about 160; a pH of about 6.8, an osmolarity of about 350, and a viscosity of about 80 to 100 centipoise.

EXAMPLE 2

One hour after the liquid food composition of Example 1 is produced, a fifty gram test sample is taken and tested at room temperature to determine whether the glutamine has formed glutamate in situ. Glutamate is not present in the sample.

EXAMPLE 3

One hour after the liquid food composition of Example 1 is produced, a fifty gram test sample is taken and tested at room temperature to determine whether creaming out has occurred. During creaming out, fats form a layer on the top of the liquid composition. Creaming out is not detected.

EXAMPLE 4

One week after the liquid food composition of Example 1 is produced, a fifty gram test sample is taken and tested at room temperature to determine whether the glutamine has formed glutamate in situ. Glutamate is not present in the sample.

EXAMPLE 5

One week after the liquid food composition of Example 1 is produced, a fifty gram test sample is taken and tested at room temperature to determine whether creaming out has occurred. Creaming out is not detected.

EXAMPLE 6

One month after the liquid food composition of Example 1 is produced, a fifty gram test sample is taken and tested at room temperature to determine whether the glutamine has formed glutamate in situ. Glutamate is not present in the sample.

EXAMPLE 7

One month after the liquid food composition of Example 1 is produced, a fifty gram test sample is taken and tested at room temperature to determine whether creaming out has occurred. Creaming out is not detected.

EXAMPLE 8

Examples 1 to 7 are repeated, except that 45,400 grams of potato starch is utilized instead of the 12,000 grams of rice starch. Similar results are obtained.

EXAMPLE 9

Examples 1 to 7 are repeated, except that 4,540 grams of tapioca is utilized instead of the 12,000 grams of rice starch. Similar results are obtained.

EXAMPLE 10

Examples 1 to 7 are repeated, except that the lecithin is not utilized. Similar results are obtained.

EXAMPLE 11

Examples 1 to 7 are repeated, except that 6,000 grams of lecithin is utilized instead of 4,082 grams. Similar results are obtained.

EXAMPLE 12

Examples 1 to 7 are repeated, except that 190,00 grams of glutamine hydrolyzate is utilized instead of 133,258 grams of glutamine hydrolyzate. Similar results are obtained.

EXAMPLE 13

Examples 1 to 7 are repeated, except that 115,000 grams of amino acid blend is utilized instead of 81,791 grams of amino acid blend. Similar results are obtained.

EXAMPLE 14

Examples 1 to 7 are repeated, except that 460 grams of polyglycerol ester is utilized instead of 281 grams. Similar results are obtained.

EXAMPLE 15

Examples 1 to 7 are repeated, except that 80 grams of polyglycerol ester is utilized instead of 281 grams. Similar results are obtained.

EXAMPLE 16

Examples 1 to 7 are repeated, except that polyglycerol ester is not utilized. Creaming out occurs in the liquid food compositions in Examples 3, 5, and 7.

EXAMPLE 17

Examples 1 to 7 are repeated, except that the vitamin-mineral premix is not utilized. Similar results are obtained in Examples 2 to 7: creaming out does not occur and glutamine does not convert to glutamate.

EXAMPLE 18

Examples 1 to 7 are repeated, except that the soybean oil (fat) is not utilized. Similar results are obtained in Examples 2 to 7: creaming out does not occur and glutamine does not convert to glutamate.

EXAMPLE 19

Examples 1 to 7 are repeated, except that the maltrin is not utilized. Similar results are obtained in Examples 2 to 7: creaming out does not occur and glutamine does not convert to glutamate.

EXAMPLE 20

Examples 1 to 7 are repeated, except that the choline chloride is not utilized. Similar results are obtained in Examples 2 to 7: creaming out does not occur and glutamine does not convert to glutamate.

Having described my invention in such terms as to enable those skilled in the art to understand and practice it, and having identified the presently preferred embodiments thereof, I claim:

1. A liquid food composition comprising:
   a) water;
   b) free amino acids;
   c) peptide bonded glutamine;
   d) triglycerides having an alkyl group comprising from 6 to 26 carbon atoms;
   e) a carbohydrate; and
   d) a polyglycerol ester of a fatty acid,
   said composition being essentially free of creaming after standing for one month at room temperature.

2. The composition of claim 1, wherein said composition comprises 0.5% by weight peptide bonded glutamine.

3. The composition of claim 1, wherein said composition comprises at least about 1.5% by weight peptide bonded glutamine.

4. The composition of claim 1, wherein said composition comprises 0.5 to 8.0% by weight peptide bonded glutamine.

5. The composition of claim 1, further comprising starch.

6. The composition of claim 1, further comprising starch selected from the group consisting of potato starch, rice starch, tapioca starch, and combinations thereof.

7. The composition of claim 1, wherein said carbohydrate is selected from the group consisting of corn syrup solids, trisaccharides, tetrasaccharides, pentasaccharides, hexasaccharides, dextrose, fructose, sucrose, maltose and combinations thereof.

8. The composition of claim 1, wherein said composition comprises 5% to about 48% by weight carbohydrate.

9. The composition of claim 1, said composition being essentially free of glutamate after standing for one month at room temperature.

10. The composition of claim 1, wherein said composition comprises 0.01% to 15% by weight triglycerides.

11. The composition of claim 1, wherein said composition comprises 0.005% to 0.25% by weight polyglycerol ester.

12. The composition of claim 1, wherein said polyglycerol ester is selected from the group consisting of diglycerol esters, triglycerol esters, tetraglycerol esters and combinations thereof.

13. The composition of claim 1, further comprising lecithin.

14. The composition of claim 1, further comprising carrageenan.

15. A method of making a liquid food composition comprising:
   combining
      a) water,
      b) free amino acids,
      c) peptide bonded glutamine,
      d) triglycerides having an alkyl group comprising from 6 to 26 carbon atoms,
      e) a carbohydrate, and
      d) a polyglycerol ester of a fatty acid,
   said composition being essentially free of creaming after standing for one month at room temperature.

16. A method of treating an individual comprising:
   delivering a liquid food composition to the stomach of the individual, said composition comprising
      a) water,
      b) free amino acids,
      c) peptide bonded glutamine,
      d) triglycerides having an alkyl group comprising from 6 to 26 carbon atoms,
      e) a carbohydrate, and
      d) a polyglycerol ester of a fatty acid,
   said composition being essentially free of creaming after standing for one month at room temperature.

17. The method of claim 16, wherein said liquid food composition is delivered to said individual through an enteral feeding tube.

* * * * *